US009846274B2

(12) United States Patent
Lai et al.

(10) Patent No.: US 9,846,274 B2
(45) Date of Patent: Dec. 19, 2017

(54) FRAME UTILIZED IN FINGERPRINT RECOGNITION PLATE, MANUFACTURING METHOD THEREOF, AND LIGHT GUIDE MECHANISM WITH THE FRAME

(71) Applicant: Concraft Holding Co., Ltd., Grand Cayman (KY)

(72) Inventors: Shih-Chia Lai, Grand Cayman (KY); Yong-Hong Jiang, Grand Cayman (KY)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 299 days.

(21) Appl. No.: 14/808,537

(22) Filed: Jul. 24, 2015

(65) Prior Publication Data

US 2017/0024600 A1 Jan. 26, 2017

(51) Int. Cl.
*G06K 9/00* (2006.01)
*F21V 8/00* (2006.01)
*G06K 9/20* (2006.01)

(52) U.S. Cl.
CPC ......... *G02B 6/0088* (2013.01); *G02B 6/0091* (2013.01); *G06K 9/0004* (2013.01); *G06K 9/00046* (2013.01); *G06K 9/2027* (2013.01)

(58) Field of Classification Search
CPC .. G02B 6/0088; G02B 6/0091; G06K 9/0004; G06K 9/00046; G06K 9/2027
See application file for complete search history.

(56) References Cited

U.S. PATENT DOCUMENTS

| 2015/0288055 | A1* | 10/2015 | Youm | H01Q 1/40 343/702 |
| 2016/0099232 | A1* | 4/2016 | Hatori | H01L 25/0657 257/778 |
| 2016/0234362 | A1* | 8/2016 | Moon | H04M 1/0202 |
| 2016/0234949 | A1* | 8/2016 | Seo | H04M 1/0202 |
| 2016/0350572 | A1* | 12/2016 | Kim | G06K 9/0002 |

* cited by examiner

Primary Examiner — Amara Abdi
(74) Attorney, Agent, or Firm — Rabin & Berdo, P.C.

(57) ABSTRACT

A frame utilized in a fingerprint recognition plate, a manufacturing method thereof, and a light guide mechanism with the frame including the frame with a hollow portion, light emitting diodes, and a light guide plate. The manufacturing method includes: forming a frame containing mixed materials having plastic materials and metallic materials in a manner of injection molding, forming patterns on the frame in a manner of laser engraving, and forming electric conductive portions in the patterns of the frame in a manner of electroplating or electroless plating. The frame is formed with electric conductive circuit. The light emitting diodes are mounted on the electric conductive portions of the frame by surface mount technology (SMT) process. Light rays emitted by the light emitting diodes can be transmitted in the light guide plate. When the frame is formed via the laser engraving process combining with electroplating process, the frame can be minimized.

10 Claims, 11 Drawing Sheets

FRAME UTILIZED IN FINGERPRINT RECOGNITION PLATE, MANUFACTURING METHOD THEREOF, AND LIGHT GUIDE MECHANISM WITH THE FRAME

BACKGROUND

Technical Field

The instant disclosure relates to a frame utilized in a fingerprint recognition plate, to a manufacturing method thereof, and to a light guide mechanism with the frame, and more particularly, to a frame utilized in an electronic device capable of allowing that a user put his finger thereon and providing sufficient brightness and contrast for fingerprint collection, to a manufacturing method thereof, and to a light guide mechanism with the frame.

Related Art

Electronic devices, such as smart phones, laptop computers, flash drives, and even smart gate locks, are usually required to store important information such as private mails or photos. Sometimes these electronic devices can be utilized as keys for unlocking or security.

Safety measures that traditional electronic devices adopt to prevent information from being stolen or invaded are mostly password type. A password that a user set is usually consisted of certain guessable numbers such as numbers based on the user's or the user's family's birthday so as to avoid the password from being forgotten. However, such password is easy to be figured out by a third-party and the risk of important information being leaked is high.

To improve the reliability of security, a safety measure regarding fingerprint recognition has been adopted by some electronic devices. The advantage of the fingerprint recognition is that fingerprints cannot be faked. The level of security for keeping things secret based upon the fingerprint recognition is significant. As shown in FIG. 1, FIG. 1 illustrates a smart phone A, which is almost a necessity in daily life for most people. Users use the smart phones A for sending and receiving mails or storing private information.

The smart phone A includes the function of fingerprint recognition for better effect of security. For example, the smart phone A includes a fingerprint recognition area B. A user who wants to access the smart phone A is required to unlock the smart phone A in advance by his fingerprint.

A conventional fingerprint recognition device includes a circuit board, an image capturing device disposed thereon, and a light guide plate disposed above the image capturing device. A light emitting diode is disposed on the side of the light guide plate. Light rays emitted by the light emitting diode can be transmitted into the light guide plate. When the user puts his finger on the fingerprint recognition area B, the brightness and contrast of the finger can be increased by the light guide plate, and, based on the increased brightness and contrast, the image capturing device is beneficial to collecting the fingerprint of the finger for further comparison.

The light emitting diode and the image capturing device of the conventional fingerprint recognition device are both disposed on the circuit board. As a result, the process of manufacturing is complex and the cost is accordingly high.

Another conventional fingerprint recognition device includes an image capturing device, a light guide plate, and a light emitting diode integrated with each other and then mounted on a circuit board. The volume of the structure of the fingerprint recognition device is fairly large. Consequently, the size of the smart phone including the fingerprint recognition device is also large and is hard to be thin and portable.

SUMMARY

According to the aforementioned prior art, a light guide mechanism of a fingerprint recognition plate which is utilized in an electronic device, is capable of allowing a finger to put thereon, provides sufficient brightness and contrast for fingerprint collection, and is as thin and portable as possible, and a manufacturing method of the light guide mechanism are needed.

To address the above issue, the instant disclosure provides a light guide mechanism of a fingerprint recognition plate and a manufacturing method thereof. In particular, the light guide mechanism of the fingerprint recognition plate is utilized in an electronic device, is capable of allowing that a user put his finger thereon, and provides sufficient brightness and contrast for fingerprint collection.

According to an embodiment of the instant disclosure, a light guide mechanism of a fingerprint recognition plate and a manufacturing method thereof comprises a frame with a hollow portion, a plurality of light emitting diodes, and a light guide plate. The manufacturing method comprises: forming a frame containing mixed materials having plastic materials and metallic materials in a manner of injection molding, forming patterns on the frame in a manner of laser engraving, and forming electric conductive portions in the patterns of the frame in a manner of electroplating or electroless plating. Such that the frame is formed with electric conductive circuit. The light emitting diodes are mounted on the electric conductive portions of the frame by surface mount technology (SMT) process. Light rays emitted by the light emitting diodes can be transmitted in the light guide plate.

When the frame is formed via the laser engraving process combining with electroplating process, the frame can be minimized. In the circumstance that the frame is utilized in an electronic device, the electronic device can be thin and compact.

The features of the instant disclosure will no doubt become understandable to those of ordinary skill in the art after reading the following detailed description of the preferred embodiment that is illustrated in the various figures and drawings.

DETAILED DESCRIPTION

Figure 1:
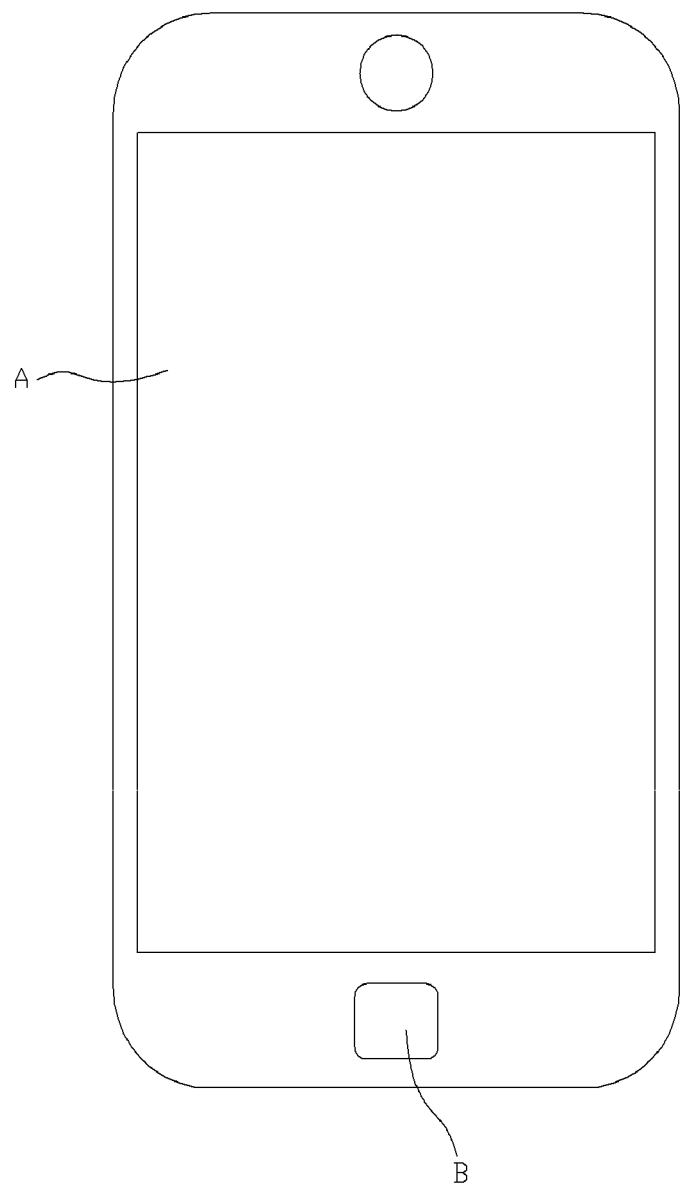
FIG. 1 illustrates a perspective view of a conventional smart phone.
Figure 2:
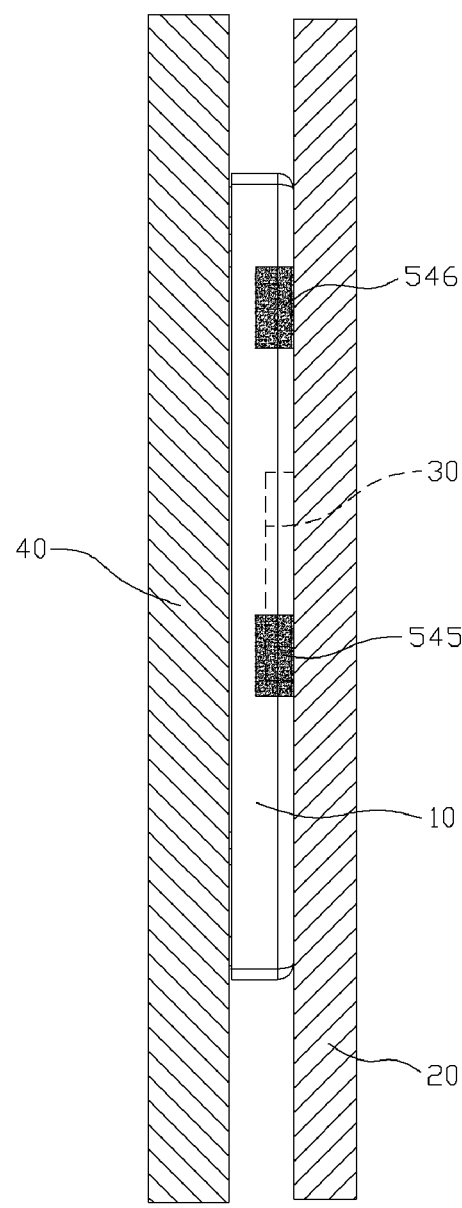
FIG. 2 illustrates a cross-sectional view of a light guide mechanism according to an embodiment of the instant disclosure.

Referring to FIG. 2, the instant disclosure relates to a frame utilized in a fingerprint recognition plate, a manufacturing method thereof, and a light guide mechanism with the frame. The light guide mechanism is capable of being mounted on a circuit board and encompassing an image capturing device.

A light guide mechanism 10 of a fingerprint recognition plate of an embodiment of the instant disclosure is, but is not limited to, installed in a smart phone. In addition to being mounted on a circuit board 20 and encompassing an image capturing device 30, the light guide mechanism 10 is covered by a protective plate 40. As a result, the light guide mechanism 10 of the fingerprint recognition plate is fixed between the circuit board 20 and the protective plate 40. In the embodiment, the protective plate 40 can be made by glass, plastic, or other transparent materials.

Figure 3:
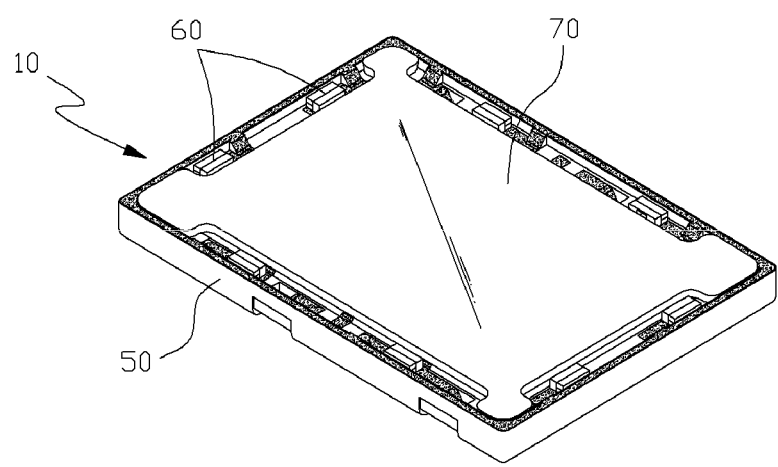
FIG. 3 illustrates a perspective view of the light guide mechanism according to an embodiment of the instant disclosure.
Figure 4:
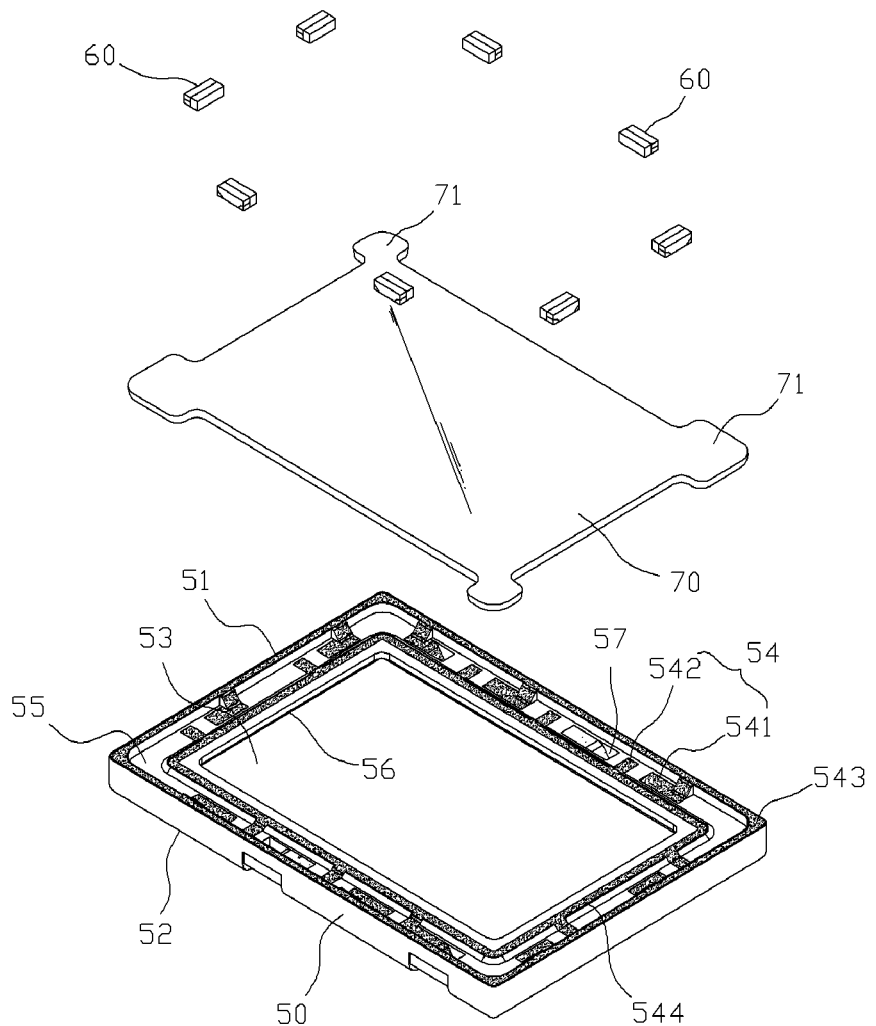
FIG. 4 illustrates an exploded view of the light guide mechanism according to an embodiment of the instant disclosure.

As shown in FIG. 3 and FIG. 4, the light guide mechanism 10 comprises a frame 50, a plurality of side view light emitting diodes (LEDs) 60, and a light guide plate 70.

As shown in FIG. 5 and FIGS. 6A to 6D, the frame 50 is formed via injection molding process combining with laser engraving process (e.g., laser direct structuring). The forming process comprises: an injection molding process 51 comprising forming the frame 50 with a hollow portion 53 in one piece containing mixed materials having plastic materials and metallic materials in a manner of injection molding, wherein the frame has an upper surface 51 and a lower surface 52; a laser engraving process S2 comprising forming a plurality of first patterns 501 and a plurality of second patterns 502 spaced to each other on the frame 50 in a manner of laser engraving by melting the plastic materials on the first patterns 501 and the second patterns 502, and activating the metallic materials in the first patterns 501 and the second patterns 502, wherein the first patterns 501 and the second patterns 502 are respectively extended from the upper surface 51 to the lower surface 52; and a metal forming process S3 comprising forming metal layers in the first patterns 501 and the second patterns 502 of the frame 50 in a manner of electroplating or electroless plating the activated metallic materials of the frame 50 so as to form a plurality of first electric conductive portions 541 and a plurality of second electric conductive portions 542 spaced to each other on the frame 50, wherein each one first electric conductive portions 541 combines with each one the second electric conductive portions 542 into a pair of electric conductive portions 54.

The injection molding process further comprises forming a step portion 55 recessed on the upper surface 51 of the frame 50. The laser engraving process further comprises having the first patterns 501 and the second patterns 502 formed on the step portion 55.

The laser engraving process further comprises respectively forming a third pattern 503 and a fourth pattern 504 on the upper surface 51 of the frame 50. The third pattern 503 is utilized for being connected to the first patterns 501. The fourth pattern 504 is utilized for being connected to the second patterns 502.

The metal forming process further comprises respectively forming metal layers in the third pattern 503 and the fourth pattern 504 the same as those in the first patterns 501 and the second patterns 502 so as to have the third pattern 503 form a first conductive portion 543 (i.e., a first metal connecting portion) and have the fourth pattern 504 form a second conductive portion 544 (i.e., a second metal connecting portion). As a result, the first electric conductive portions 541 are electrically connected to each other, and the second electric conductive portions 542 are electrically connected to each other in series.

The frame 50 formed via aforementioned process comprises the upper surface 51 and the lower surface 52 opposite to the upper surface 51. The hollow portion 53 is formed at the center of the frame 50. The frame 50 comprises at least one pair of electric conductive portions 54. Each pair of electric conductive portions 54 comprise the first electric conductive portion 541 and the second electric conductive portion 542 spaced to each other. In the embodiment, the frame 50 comprises multiple pairs of electric conductive portions 54 formed thereon. The first electric conductive portions 541 of each pair of the electric conductive portions 54 are connected to each other in series. The second electric conductive portions 542 of each pair of the electric conductive portions 54 are connected to each other in series.

In the embodiment, the frame 50 comprises the step portion 55 recessed on the upper surface 51. The step portion 55 is around the outside of the hollow portion 53. The frame 50 further comprises a platform 56 protruding from the step portion 55 toward the hollow portion 53. The platform 56 is around the hollow portion 53. The first electric conductive portions 541 and the second electric conductive portions 542 of the electric conductive portions 54 are disposed on the step portion 55.

Figure 6A:
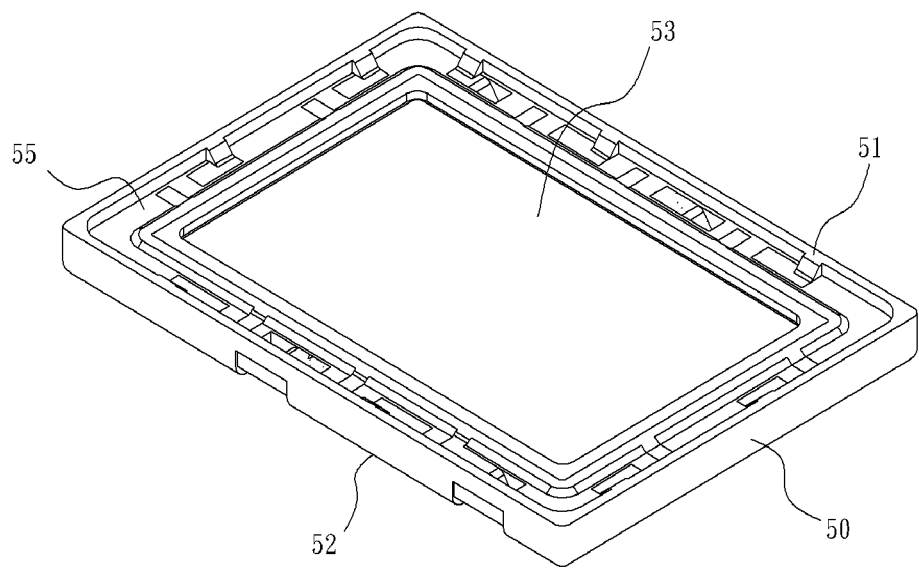
FIG. 6A illustrates a perspective view of the frame after the injection molding process according to an embodiment of the instant disclosure.
Figure 6B:
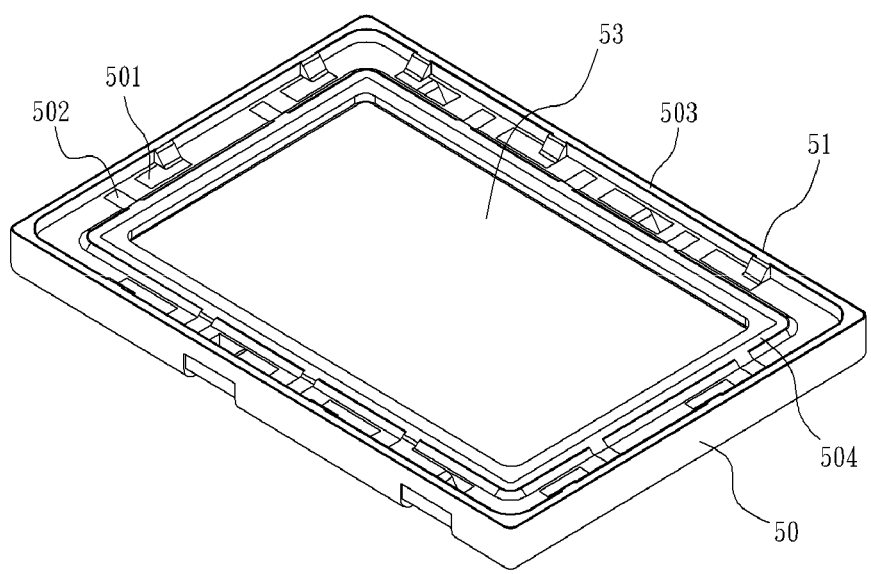
FIG. 6B illustrates a perspective view of the frame after the laser engraving process according to an embodiment of the instant disclosure.
Figure 6C:
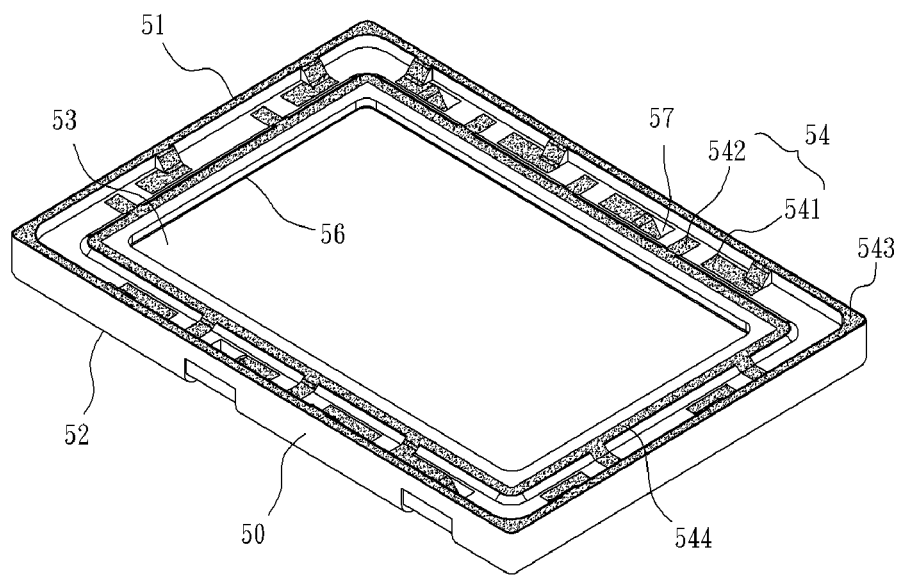
FIG. 6C illustrates a perspective view of the frame after the electroplating process according to an embodiment of the instant disclosure.
Figure 6D:
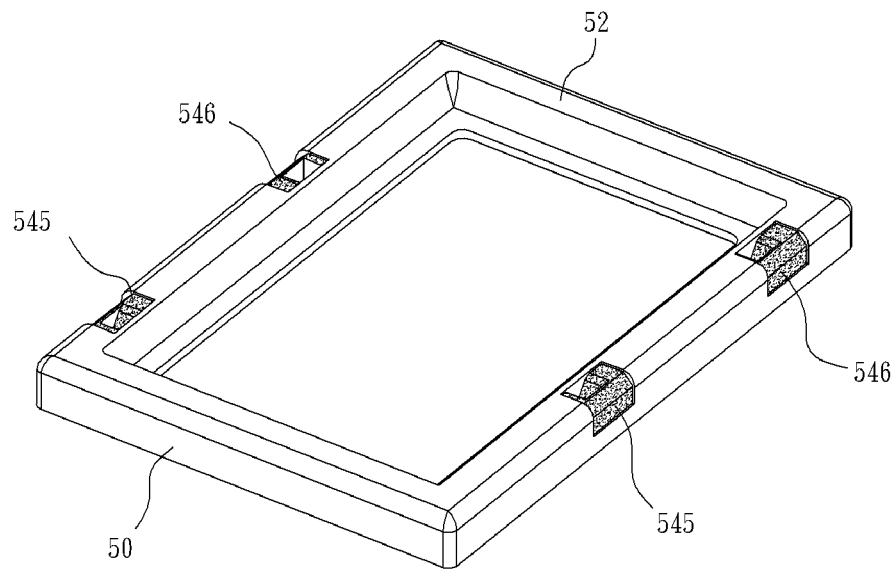
FIG. 6D illustrates a perspective view of a rear side of the frame after the electroplating process according to an embodiment of the instant disclosure.
Figure 7:
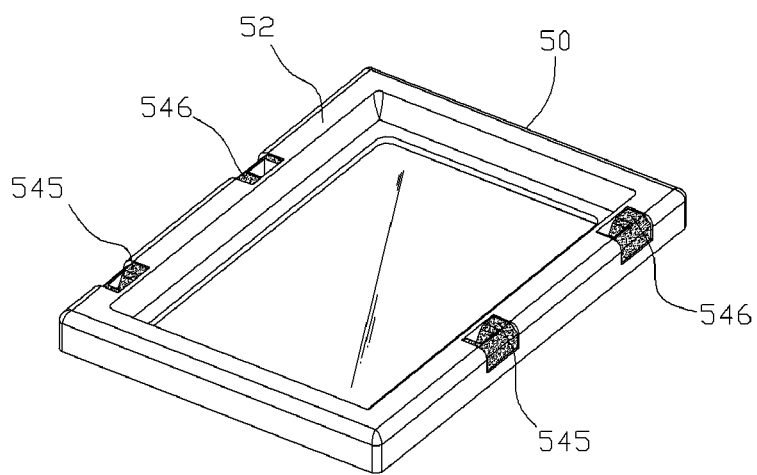
FIG. 7 illustrates a perspective view of a rear side of the light guide mechanism according to an embodiment of the instant disclosure.
Figure 8:
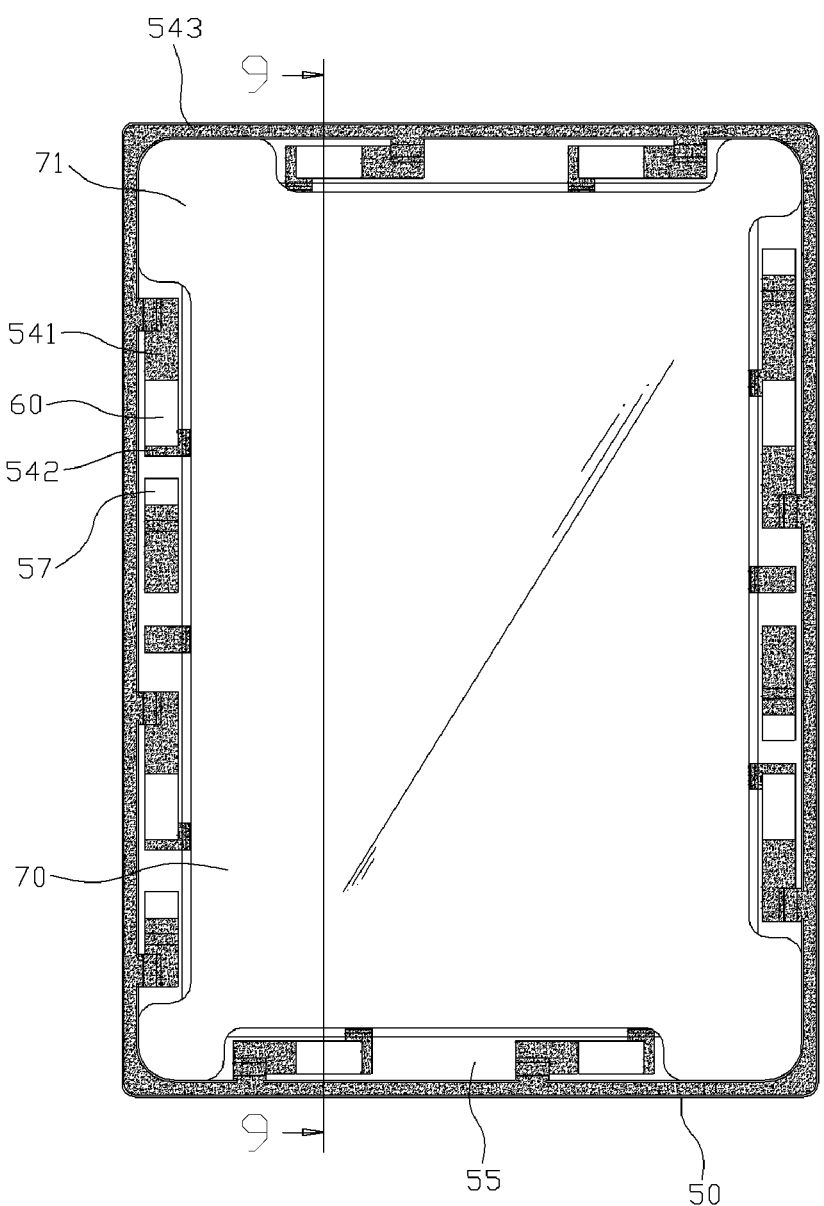
FIG. 8 illustrates a perspective view of a front side of the light guide mechanism according to an embodiment of the instant disclosure.
Figure 9:
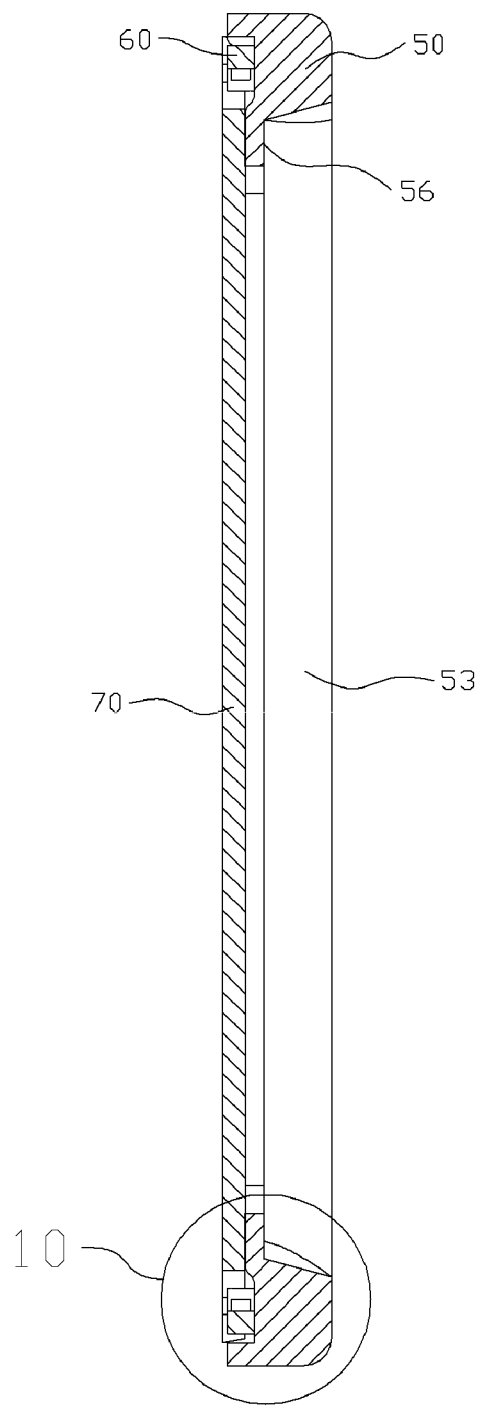
FIG. 9 illustrates a cross-sectional view of FIG. 8.
Figure 10:
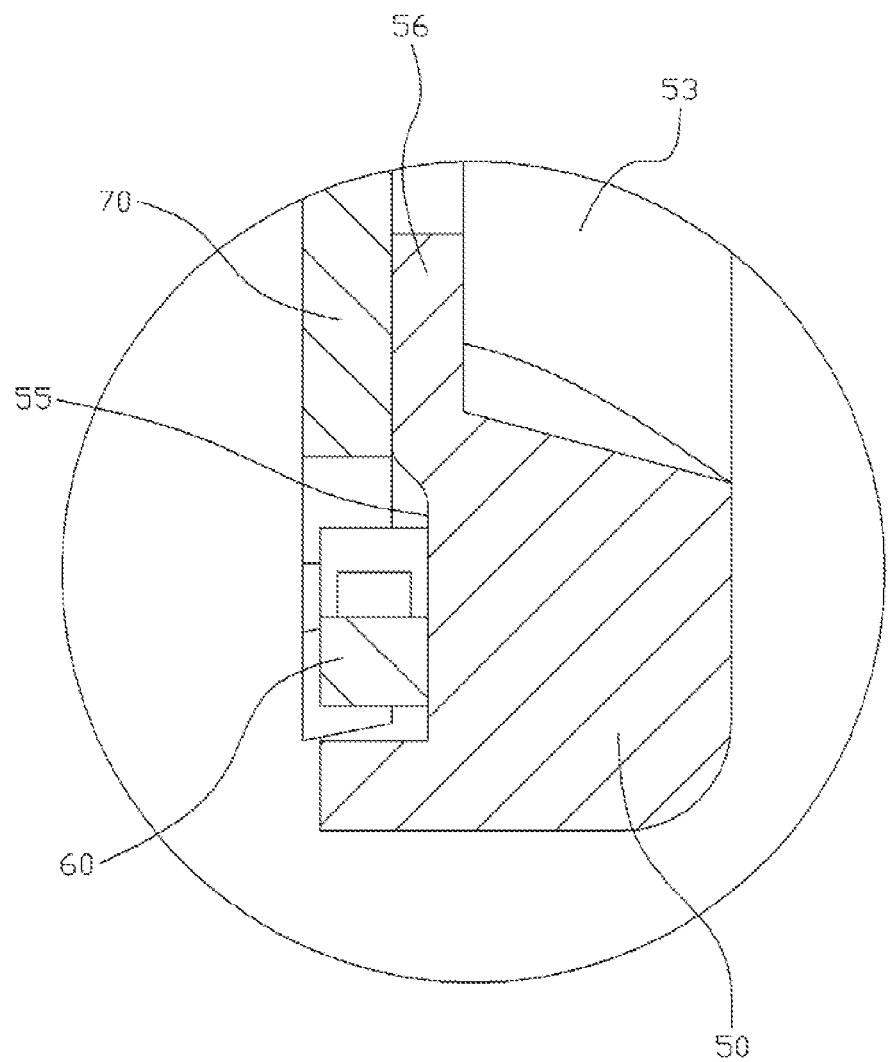
FIG. 10 illustrates an enlarged view of the encircled area of FIG. 9.

Referring to FIG. 6C, FIG. 6D, and FIG. 7, the frame 50 further comprises a plurality of through holes 57 extending from the step portion 55 toward the lower surface 52. Parts of the first electric conductive portion 541 and the second electric conductive portion 542 extend to the lower surface 52 via the trough hole 57 to form at least a first contact 545 and at least a second contact 546. The frame 50 can be electrically connected to and be mounted on the circuit board 20 via the first contacts 545 and the second contacts 546.

In practical application, the first electric conductive portions 541 and the second electric conductive portions 542 are independent of each other and respectively extend to the lower surface 52 of the frame 50 to form the first contacts 545 and the second contacts 546. Alternatively, the first electric conductive portions 541 and the second electric conductive portions 542 are connected to each other in series. The number of the first contacts 545 and the second contacts 546 is variable according to the design of the circuit board 20.

Figure 5:
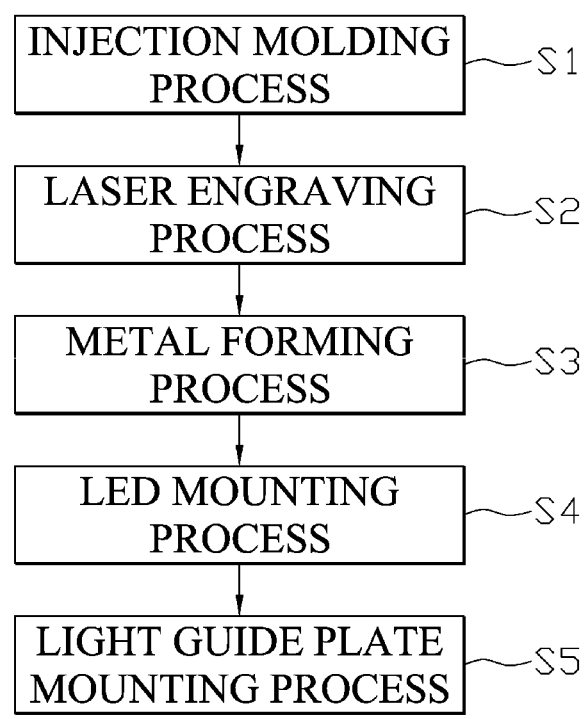
FIG. 5 illustrates a flow chart of a manufacturing process of the light guide mechanism according to an embodiment of the instant disclosure.

As shown in FIG. 2, FIG. 3 and FIG. 5, the instant disclosure provides a manufacturing process of the light guide mechanism 10 of the fingerprint recognition plate. In addition to the manufacturing process of the frame 50, the manufacturing process of the light guide mechanism 10 further comprises: an LED mounting process S4 comprising providing the side view LEDs 60 after the formation of the frame 50, having each of the side view LEDs 60 mounted on the frame 50 by SMT process, and having each one side view LED 60 electrically connected to each one first electric conductive portion 541 and each one second electric conductive portion 542; and a light guide plate mounting process S5 comprising providing the light guide plate 70, having the light guide plate 70 mounted on the frame 50 opposite to and above the hollow portion 53, and having the LEDs 60 disposed around the side of the light guide plate 70.

In the embodiment, the side view LEDs 60 are disposed in the step portion 55 of the frame 50. Each of side view the LEDs 60 is corresponding to one pair of the electric conductive portion 54 and is electrically connected to the first electric conductive portion 541 and the second electric conductive portion 542 of the pair of the electric conductive portion 54. Based on the electrical connection of the circuit board 20, the side view LEDs 60 can emit light rays toward the hollow portion 53 of the frame 50.

The light guide plate 70 is disposed on the platform 56 of the frame 50 and is above the hollow portion 53. The side view LEDs 60 are disposed around the side of the light guide plate 70. As a result, light rays emitted from the LEDs 60 can be further transmitted into the light guide plate 70 and be refracted in the light guide plate 70 such that the whole light guide plate 70 can be brightened. The aforementioned elements constitutes the light guide mechanism 10 utilized in the fingerprint recognition plate.

In addition, the four corners of the light guide plate 70 are further protruded to respectively form a protruding portion 71. The protruding portions 71 cover the step portion 55 of the frame 50. Each two of the protruding portions 71 at diagonally opposite corners have corresponding shape. The light guide plate 70 is coupled to the frame 50 via the protruding portions 71.

Referring to FIG. 2, FIG. 8, FIG. 9, and FIG. 10, the frame 50 is mounted on the circuit board 20 via the first contacts 545 and the second contacts 546. The frame 50 effectively surrounds and encompasses the image capturing device 30 based upon the hollow portion 53 at the center of the frame 50.

The side view LEDs 60 are disposed in the step portion 55 of the frame 50 and around the side of the light guide plate 70; therefore, light rays emitted from the side view LEDs 60 can be effectively transmitted into the light guide plate 70 such that the light guide plate 70 can be evenly brightened.

When a user put his finger on the light guide plate 70 or on the protective plate 40 above the light guide plate 70, the image capturing device 30 can capture a distinctive fingerprint image of the finger based upon the side view LEDs 60 which have the light guide plate 70 evenly brightened so as to improve the effect of fingerprint recognition.

In addition, the light guide mechanism 10 of the fingerprint recognition plate of the instant disclosure can be directly mounted on the circuit board 20 since the side view LEDs 60 are integrated with the frame 50. The procedure of assembling of the electronic device can be simplified, and the cost of manufacturing can be accordingly reduced. Furthermore, the image capturing device 30 is independently disposed on the circuit board 20 and is encompassed by the light guide mechanism 10 of the fingerprint recognition plate of the instant disclosure. Consequently, the electronic device can have a reduced volume and can be more thin and compact.

In practical assembly situations, the frame 50 can be mounted on the circuit board 20 in advance, and then the light guide plate 70 can be mounted on and below the protective plate 40 corresponding to the position of the frame 50. Next process is that the circuit board 20 and the protective plate 40 can be assembled to each other. As a result, the image capturing device 30 can be effectively mounted on the center of the hollow portion 53, which allows the image capturing device 30 to collect fingerprints in a more efficient way. And also the assembly of the light guide mechanism 10 of the fingerprint recognition plate is more accurate.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A manufacturing method of a frame utilized in a fingerprint recognition plate, comprising:
    an injection molding process comprising: forming a frame with a hollow portion in one piece containing mixed materials having plastic materials and metallic materials in a manner of injection molding, wherein the frame has an upper surface and a lower surface;
    a laser engraving process comprising: forming a plurality of first patterns and a plurality of second patterns spaced to each other on the frame in a manner of laser engraving, and activating the metallic materials in the first patterns and the second patterns, wherein the first patterns and the second patterns are respectively extended from the upper surface to the lower surface; and
    a metal forming process comprising: forming metal layers in the first patterns and the second patterns of the frame in a manner of electroplating or electroless plating the activated metallic materials of the frame so as to form a plurality of first electric conductive portions and a plurality of second electric conductive portions spaced to each other on the frame.

2. The manufacturing method of a frame utilized in a fingerprint recognition plate of claim 1, wherein the injection molding process further comprises forming a step portion recessed on the upper surface of the frame and the laser engraving process further comprises having the first patterns and the second patterns formed on the step portion.

3. The manufacturing method of a frame utilized in a fingerprint recognition plate of claim 2, wherein the laser engraving process further comprises respectively forming a third pattern and a fourth pattern on the upper surface of the frame, the third pattern is utilized for being connected to the first patterns, and the fourth pattern is utilized for being connected to the second patterns.

4. The manufacturing method of a frame utilized in a fingerprint recognition plate of claim 3, wherein the metal forming process further comprises respectively forming metal layers in the third pattern and the fourth pattern the same as those in the first patterns and the second patterns so as to have the third pattern form a first metal connecting portion and have the fourth pattern form a second metal connecting portion.

5. A manufacturing method of a light guide mechanism with a frame of claim 1, comprising:
    a light emitting diode mounting process comprising: providing a plurality of light emitting diodes, mounting the light emitting diodes on the frame, and having each of the light emitting diodes electrically connected to each of the first electric conductive portions and each of the second electric conductive portions; and a light guide plate mounting process comprising: providing a light guide plate, mounting the light guide plate on the frame above the hollow portion, and having the light emitting diodes disposed around the side of the light guide plate.

6. The manufacturing method of a light guide mechanism of claim 5, wherein the injection molding process further comprises forming a step portion recessed on the upper surface of the frame and the laser engraving process further comprises having the first patterns and the second patterns formed on the step portion.

7. The manufacturing method of a light guide mechanism of claim 6, wherein the laser engraving process further comprises respectively forming a third pattern and a fourth pattern on the upper surface of the frame, the third pattern is utilized for being connected to the first patterns, and the fourth pattern is utilized for being connected to the second patterns.

8. The manufacturing method of a light guide mechanism of claim 7, wherein the metal forming process further comprises respectively forming metal layers in the third pattern and the fourth pattern the same as those in the first patterns and the second patterns so as to have the third pattern form a first metal connecting portion and have the fourth pattern form a second metal connecting portion.

9. A light guide mechanism, comprising:

a frame with a hollow portion in one piece containing mixed materials having plastic materials and metallic materials formed in a manner of injection molding, wherein the frame comprising:

an upper surface and a lower surface;

a plurality of first patterns and a plurality of second patterns spaced to each other on the frame formed in a manner of laser engraving to activate the metallic materials in the first patterns and the second patterns, wherein the first patterns and the second patterns are respectively extended from the upper surface to the lower surface; and a plurality of metal layers in the first patterns and the second patterns of the frame formed in a manner of electroplating or electroless plating the activated metallic materials of the frame so as to form a plurality of first electric conductive portions and a plurality of second electric conductive portions spaced to each other on the frame;

a plurality of light emitting diodes mounted on the frame, each of the light emitting diodes being electrically connected to each of the first electric conductive portions and each of the second electric conductive portions; and a light guide plate mounted on the frame above the hollow portion, the light emitting diodes being disposed around the side of the light guide plate.

10. The light guide mechanism of claim 9, wherein the frame comprises a step portion recessed on the upper surface of the frame, and the first electric conductive portions and the second electric conductive portions are disposed on the step portion.

* * * * *